(12) United States Patent
Steele et al.

(10) Patent No.: US 9,234,613 B2
(45) Date of Patent: Jan. 12, 2016

(54) WELL ASSEMBLY COUPLING

(75) Inventors: David Joe Steele, Arlington, TX (US); Srinivasa Prasanna Vemuri, Irving, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 1057 days.

(21) Appl. No.: 12/789,822

(22) Filed: May 28, 2010

(65) Prior Publication Data
US 2011/0290476 A1 Dec. 1, 2011

(51) Int. Cl.
*E21B 17/08* (2006.01)
*F16L 15/00* (2006.01)
*F16L 15/04* (2006.01)

(52) U.S. Cl.
CPC .............. *F16L 15/003* (2013.01); *F16L 15/04* (2013.01)

(58) Field of Classification Search
USPC .................................... 166/242.4, 378, 77.51
See application file for complete search history.

(56) References Cited

U.S. PATENT DOCUMENTS

| | | | |
|---|---|---|---|
| 3,178,088 A | 4/1965 | Herr | |
| 3,980,106 A | 9/1976 | Wiggins | |
| 4,024,724 A | 5/1977 | Horton | |
| 4,384,737 A * | 5/1983 | Reusser | 285/334 |
| 4,735,444 A * | 4/1988 | Skipper | 285/288.1 |
| 4,890,675 A | 1/1990 | Dew | |
| 5,275,240 A * | 1/1994 | Peterson et al. | 166/242.2 |
| 5,297,640 A | 3/1994 | Jones | |
| 5,322,135 A | 6/1994 | Travis | |
| 5,458,209 A | 10/1995 | Hayes et al. | |
| 5,462,120 A | 10/1995 | Gondouin | |
| 5,564,503 A | 10/1996 | Longbottom et al. | |
| 5,579,829 A | 12/1996 | Comeau et al. | |
| 5,615,740 A | 4/1997 | Comeau et al. | |
| 5,749,605 A * | 5/1998 | Hampton et al. | 285/48 |
| 5,887,655 A | 3/1999 | Haugen et al. | |
| 5,906,400 A * | 5/1999 | Gandy | 285/55 |
| 5,944,108 A | 8/1999 | Baugh et al. | |
| 6,012,526 A | 1/2000 | Jennings et al. | |
| 6,012,527 A | 1/2000 | Nitis et al. | |
| 6,041,855 A * | 3/2000 | Nistor | 166/50 |

(Continued)

FOREIGN PATENT DOCUMENTS

| | | |
|---|---|---|
| CN | 1420972 | 5/2003 |
| WO | WO 9809053 | 3/1998 |
| WO | WO 2009142914 | 11/2009 |

OTHER PUBLICATIONS

Thiele, Jr., et al., "Comparative Machinability of Brasses, Steels and Aluminum Allows: CDA's Universal Machinability Index," SAE Technical Paper 900365, Feb. 1990 (ten pages).

(Continued)

*Primary Examiner* — D. Andrew
(74) *Attorney, Agent, or Firm* — Kilpatrick Townsend & Stockton LLP

(57) ABSTRACT

Assemblies that can be disposed in a subterranean bore and that can facilitate branch wellbore creation are described. An assembly can include threadedly coupled components having inner and outer sealing members in grooves. The sealing member can cooperate with the components to provide a pressure seal. The assembly can also include a venting member for equalizing pressure in a chamber defined by the coupled components. One of the components can be made from aluminum. At least part of that component can be coated with a coating material that is nonconductive.

9 Claims, 10 Drawing Sheets

(56) References Cited

U.S. PATENT DOCUMENTS

| | | | |
|---|---|---|---|
| 6,065,209 A | 5/2000 | Gondouin | |
| 6,070,665 A | 6/2000 | Singleton et al. | |
| 6,073,697 A | 6/2000 | Parlin et al. | |
| 6,202,752 B1 | 3/2001 | Kuck et al. | |
| 6,206,111 B1 * | 3/2001 | Nistor | 175/61 |
| 6,209,644 B1 | 4/2001 | Brunet | |
| 6,213,228 B1 | 4/2001 | Saxman | |
| 6,374,924 B1 | 4/2002 | Hanton et al. | |
| 6,386,287 B2 | 5/2002 | George | |
| 6,419,021 B1 | 7/2002 | George et al. | |
| 6,419,026 B1 | 7/2002 | MacKenzie et al. | |
| 6,533,040 B2 | 3/2003 | Gondouin | |
| 6,536,525 B1 | 3/2003 | Haugen et al. | |
| 6,547,006 B1 | 4/2003 | Kuck et al. | |
| 6,550,550 B2 | 4/2003 | Hanton et al. | |
| 6,561,279 B2 | 5/2003 | MacKenzie et al. | |
| 6,766,859 B2 | 7/2004 | Haugen et al. | |
| 6,811,189 B1 | 11/2004 | DeLange et al. | |
| 6,848,504 B2 | 2/2005 | Brunet et al. | |
| 6,868,909 B2 | 3/2005 | Murray | |
| 6,913,082 B2 | 7/2005 | McGlothen et al. | |
| 6,945,279 B2 | 9/2005 | Baba et al. | |
| 7,025,144 B2 | 4/2006 | Haugen et al. | |
| 7,104,324 B2 | 9/2006 | Wetzel et al. | |
| 7,213,652 B2 | 5/2007 | Hepburn et al. | |
| 7,225,875 B2 | 6/2007 | Steele et al. | |
| 7,487,840 B2 * | 2/2009 | Gammage et al. | 166/380 |
| 7,588,056 B2 | 9/2009 | Lord et al. | |
| 7,703,524 B2 | 4/2010 | Parlin | |
| 7,726,401 B2 | 6/2010 | Parlin et al. | |
| 2002/0170713 A1 | 11/2002 | Haugen et al. | |
| 2003/0075334 A1 | 4/2003 | Haugen et al. | |
| 2003/0141063 A1 | 7/2003 | Haugen et al. | |
| 2004/0011529 A1 | 1/2004 | McGarian et al. | |
| 2004/0168807 A1 | 9/2004 | McGlothen et al. | |
| 2004/0262006 A1 | 12/2004 | Dewey et al. | |
| 2005/0145392 A1 | 7/2005 | Haugen et al. | |
| 2006/0201570 A1 | 9/2006 | Lord et al. | |
| 2006/0289156 A1 | 12/2006 | Murray | |
| 2009/0045974 A1 | 2/2009 | Patel | |
| 2009/0255687 A1 | 10/2009 | McCullough et al. | |
| 2009/0272537 A1 | 11/2009 | Alikin et al. | |
| 2009/0288829 A1 | 11/2009 | Parlin | |
| 2010/0051269 A1 | 3/2010 | Smithson et al. | |

OTHER PUBLICATIONS

Parker T. Seals, "A Seal Usable in Standard O-Ring Grooves With Built-in Resistance to Spiralling and Extrusion," Parker Seal Group, Irvine, 1992 (five pages).

Hilbert, et al., "Evaluating Pressure Integrity of Polymer Ring Seals for Threaded Connections in HP/HT Wells and Expandable Casing," 2004, IADC/SPE Drilling Conference (twelve Pages).

U.S. Appl. No. 12/700,448, filed Feb. 4, 2010 (thirty-seven pages).

U.S. Appl. No. 12/726,717, filed Mar. 18, 2010 (twenty-nine pages).

U.S. Appl. No. 12/750,215, filed Mar. 30, 2010 (twenty-seven pages).

U.S. Appl. No. 12/751,343, filed Mar. 31, 2010 (thirty-two pages).

Chinese Patent Application No. 201110139098.5, "First Office Action", mailed May 6, 2014, 12 pages.

Canadian Patent Application No. 2,740,330, Office Action mailed Aug. 7, 2014, 3 pages.

Canadian Patent Application No. 2,740,330, Office Action, mailed Oct. 3, 2013, 3 pages.

Chinese Application No. 201110139098.5, Office Action mailed on Dec. 10, 2014, 6 pages (containing 3 pages for an English translation and 3 pages for the original document).

Australian Application No. 2011202160, First Examiner Report mailed on Jan. 14, 2015, 3 pages.

* cited by examiner

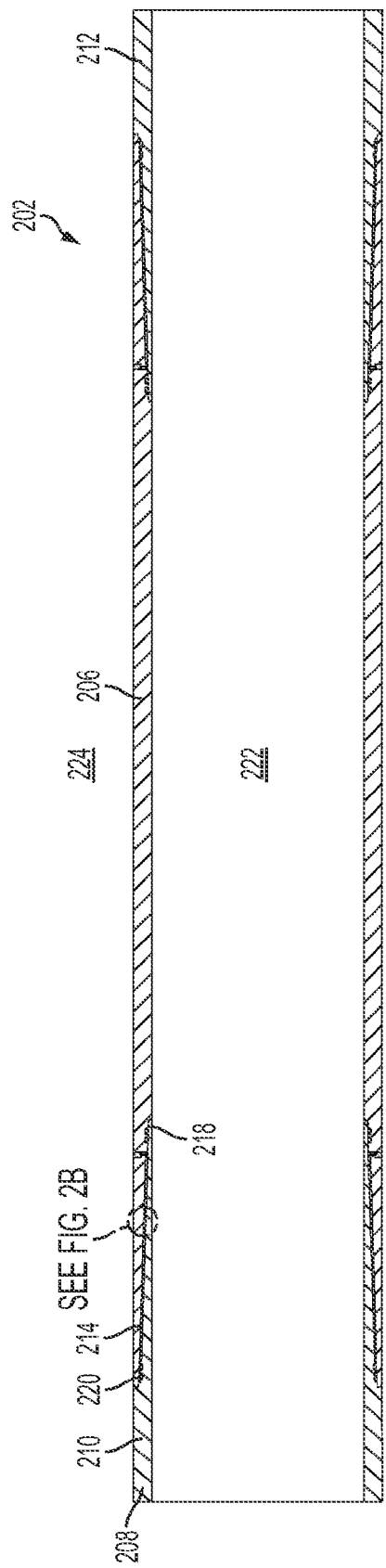
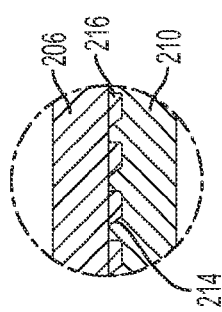
FIG. 2A
FIG. 2B

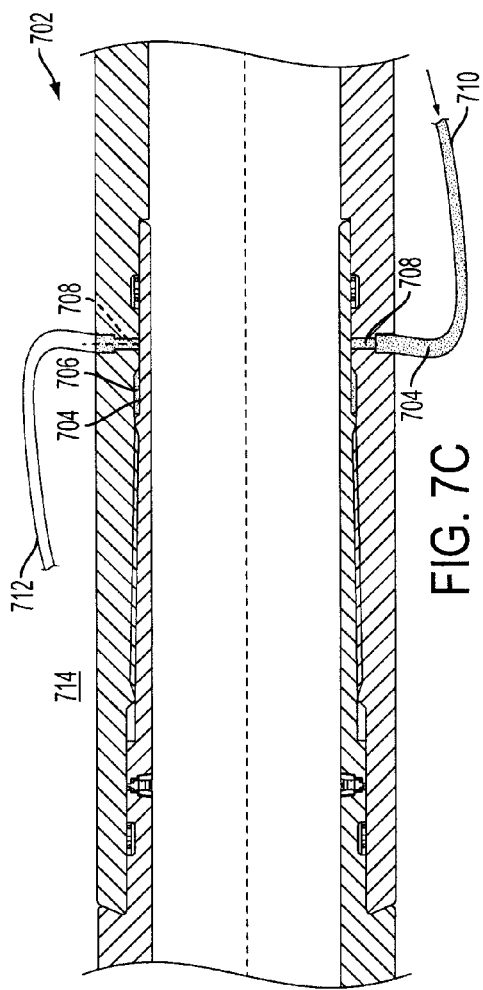
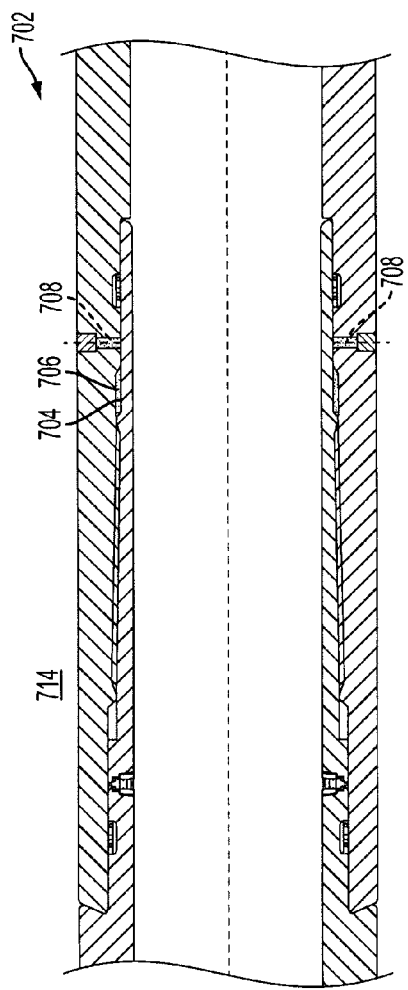

WELL ASSEMBLY COUPLING

TECHNICAL FIELD OF THE INVENTION

The present invention relates generally to an assembly for subterranean fluid production and, more particularly (although not necessarily exclusively), to a threaded coupling of an assembly.

BACKGROUND

Hydrocarbons can be produced through a wellbore traversing a subterranean formation. The wellbore may be relatively complex. For example, the wellbore can include multilateral wellbores and/or sidetrack wellbores. Multilateral wellbores include one or more lateral wellbores extending from a parent (or main) wellbore. A sidetrack wellbore is a wellbore that is diverted from a first general direction to a second general direction. A sidetrack wellbore can include a main wellbore in a first direction and a secondary wellbore diverted from the main wellbore and in a second general direction. A multilateral wellbore can include a window to allow lateral wellbores to be formed. A sidetrack wellbore can include a window to allow the wellbore to be diverted to the second general direction.

A window can be formed by positioning a casing joint and a whipstock in a casing string at a desired location in the main wellbore. The whipstock can deflect one or more mills laterally (or in another orientation) relative to the casing string. The deflected mills penetrate part of the casing joint to form the window in the casing string through which drill bits can form the lateral wellbore or the secondary wellbore.

Casing joints are often made from high-strength material. The high-strength material may also be non-corrosive to withstand corrosive elements, such as hydrogen sulfide and carbon dioxide, which may be present in the subterranean environment. Milling a portion of the high-strength material can be difficult and can create a large amount of debris, such as small pieces of the casing joint, that can affect detrimentally well completion and hydrocarbon production. Even casing joints having a portion of a sidewall with a smaller thickness through which a window can be milled can introduce debris, particularly if the casing joints are made from a dense, high-strength material. The debris can prevent the whipstock from being retrieved easily after milling is completed, plug flow control devices, damage seals, obstruct seal bores, and interfere with positioning components in the main bore below the casing joint.

Casing joints with pre-milled windows can be used to reduce or eliminate debris. The pre-milled windows can include a fiberglass outer liner to prevent particulate materials from entering the inner diameter of the casing string. The fiberglass outer liner can be milled easily and milling the fiberglass outer liner can result in less debris as compared to drilling a window through a casing joint made from high-strength material.

The casing joint can experience high pressure in a subterranean formation. Additional support may be desired in view of the high pressure on the casing joint. An aluminum sleeve can be provided exterior to the casing joint at the location of the window to provide the additional support. O-rings can be provided at each end of the aluminum sleeve to provide a seal between the aluminum sleeve and the casing joint. The aluminum sleeves and the O-rings increase the outer diameter of the casing string. In some applications, the outer diameter may be increased by one or more inches. An increase in outer diameter can be unacceptable in some situations. Material through which milling is easier can be located in the opening to avoid increasing the diameter. Coupling the material to the other components of a casing string can be difficult, however.

Therefore, an assembly with material through which a window can be formed is desirable that can include a mechanism by which the material is coupled to other components of a casing string.

SUMMARY

Certain embodiments of the present invention are directed to threadedly coupling two components in which one component is easier to mill than the other component. The coupled components can have inner and outer sealing members in grooves. The sealing member can cooperate with the components to provide a pressure seal. The coupled components can also include a venting member for equalizing pressure in a chamber defined by the coupled components. One of the components can be made from aluminum. At least part of that component can be coated with a coating material that improves wear resistance of the aluminum component.

In one aspect, an assembly capable of being disposed in a subterranean bore is provided. The assembly includes a first component, a second component, an inner sealing member, and an outer sealing member. The second component is threadedly coupled to the first component to define an inner region. The first component is easier to mill than the second component. The inner sealing member and the outer sealing member can cooperate with the first component and the second component to provide a pressure seal between the inner region and an environment exterior to the first component and the second component.

In at least one embodiment, the inner sealing member is disposed in a first component groove. The outer sealing member disposed in a second component groove.

In at least one embodiment, the inner sealing member and the outer sealing member each comprise at least one of a ring seal, a T-seal, a bonded seal, or an injectable sealing material.

In at least one embodiment, the inner sealing member includes part of the first component coupled by a metal-to-metal interference fit to part of the second component to form a seal against an inside pressure. The outer sealing member includes another part of the first component coupled by a metal-to-metal interference fit to another part of the second component to form a seal against an outside pressure.

In at least one embodiment, the first component is made from aluminum.

In at least one embodiment, the assembly includes a sleeve disposed in the inner region such that at least part of the sleeve is adjacent to at least part of the first component. The sleeve can reduce at least one of wear or corrosion of at least part of the assembly.

In at least one embodiment, the sleeve is coupled to the first component by at least one of a mechanical fastener, an adhesive, a weld, a snap ring, or a castellation.

In at least one embodiment, the first component is made from aluminum and it includes an inner wall having threads for coupling to the second component. The threads are coated by a coating material capable of being between the threads and the second component when the threads are coupled to the second component. The coating material is nonconductive.

In at least one embodiment, the second component threadedly coupled to the first component defines at least one chamber between the first component and the second component. The assembly also includes a venting member in fluid communication with the at least one chamber and in fluid communication with an area outside of the first component and the second component.

In at least one embodiment, the first component includes a first element and a second element. The first element is threadedly coupled to the second component. The second element can be milled after being disposed in the bore. The second element is made from a material that includes at least one of fabric reinforced polymer, carbon fiber, fiberglass, para-aramid synthetic fiber, silicon carbide, aluminum, or carbon nanotubes.

In another aspect, a casing joint of a casing string capable of being disposed in a bore of a subterranean formation is described. The casing joint includes a first component, a second component, and a venting member. The second component is threadedly coupled to the first component to define at least one chamber between the first component and the second component. The first component is easier to mill than the second component. The venting member is in fluid communication with the chamber and in fluid communication with an area outside of the second component threadedly coupled to the first component.

In at least one embodiment, the venting member can equalize pressure of the at least one chamber with the pressure of the area outside of the second component threadedly coupled to the first component.

In at least one embodiment, the venting member includes a pressure compensator that can decrease a differential pressure of the chamber.

In at least one embodiment, the venting member is a channel for allowing an epoxy to traverse to the chamber. The epoxy can seal the chamber from an area outside of the second component threadedly coupled to the first component.

In another aspect, an assembly that can be disposed in a bore of a subterranean formation is described. The assembly includes a first component made from aluminum. The first component includes an inner wall that has threads for coupling to a second component to define an inner region and to provide a pressure seal between the inner region and an environment exterior to the first component and the second component. The threads are coated by a coating material capable of being between the threads and the second component when the threads are coupled to the second component. The coating material is nonconductive.

In at least one embodiment, the first component includes an outer wall that has a second coating material disposed on at least part of the outer wall. The second coating material is more corrosion resistant than aluminum or nonconductive.

In at least one embodiment, the coating material and the second coating material are the same type of material.

In at least one embodiment, the threads can be coated by the coating material by at least one of soft anodize coating, electroless nickel plating, anodized coating, a nano high velocity oxygen fuel (HVOF) coating, or thermal spray coating.

In at least one embodiment, the coating material of the threads is at least one of polytetrafluoroethylene, a plastic, a ceramic, a nonconductive material, or a metal.

In another aspect, a casing string that can be disposed in a bore is described. The casing string includes steel joints and an aluminum joint coupled to a steel joint. The aluminum joint includes an inner wall. At least part of the inner wall is coated with a coating material to improve wear resistance of the inner wall.

In at least one embodiment, the coating material is at least one of an epoxy-phenolic material, epoxy and polyphenylene sulfide composite material, or a synergistic coating material.

In at least one embodiment, the aluminum joint includes an outer wall. At least part of the outer wall is coated with a second coating material to improve wear resistance of the outer wall and to improve corrosion resistance of the outer wall.

In at least one embodiment, the second coating material is the same type of material as the coating material.

In at least one embodiment, the coating material coating at least part of the inner wall is capable of improving corrosion resistance of the inner wall.

These illustrative aspects and embodiments are mentioned not to limit or define the invention, but to provide examples to aid understanding of the inventive concepts disclosed in this application. Other aspects, advantages, and features of the present invention will become apparent after review of the entire application.

BRIEF DESCRIPTION OF THE DRAWINGS

FIG. 2A is a cross-sectional view of an assembly according to an embodiment of the present invention.

FIG. 2B is a more detailed view of rings and grooves of the assembly in FIG. 2A.

FIG. 7C is a cross-sectional view of the coupling of FIG. 7A with epoxy in the chamber according to one embodiment of the present invention.

FIG. 7D is a cross-sectional view of the coupling of FIG. 7A with epoxy hardened in the chamber to seal the chamber according to one embodiment of the present invention.

DETAILED DESCRIPTION

Figure 1:
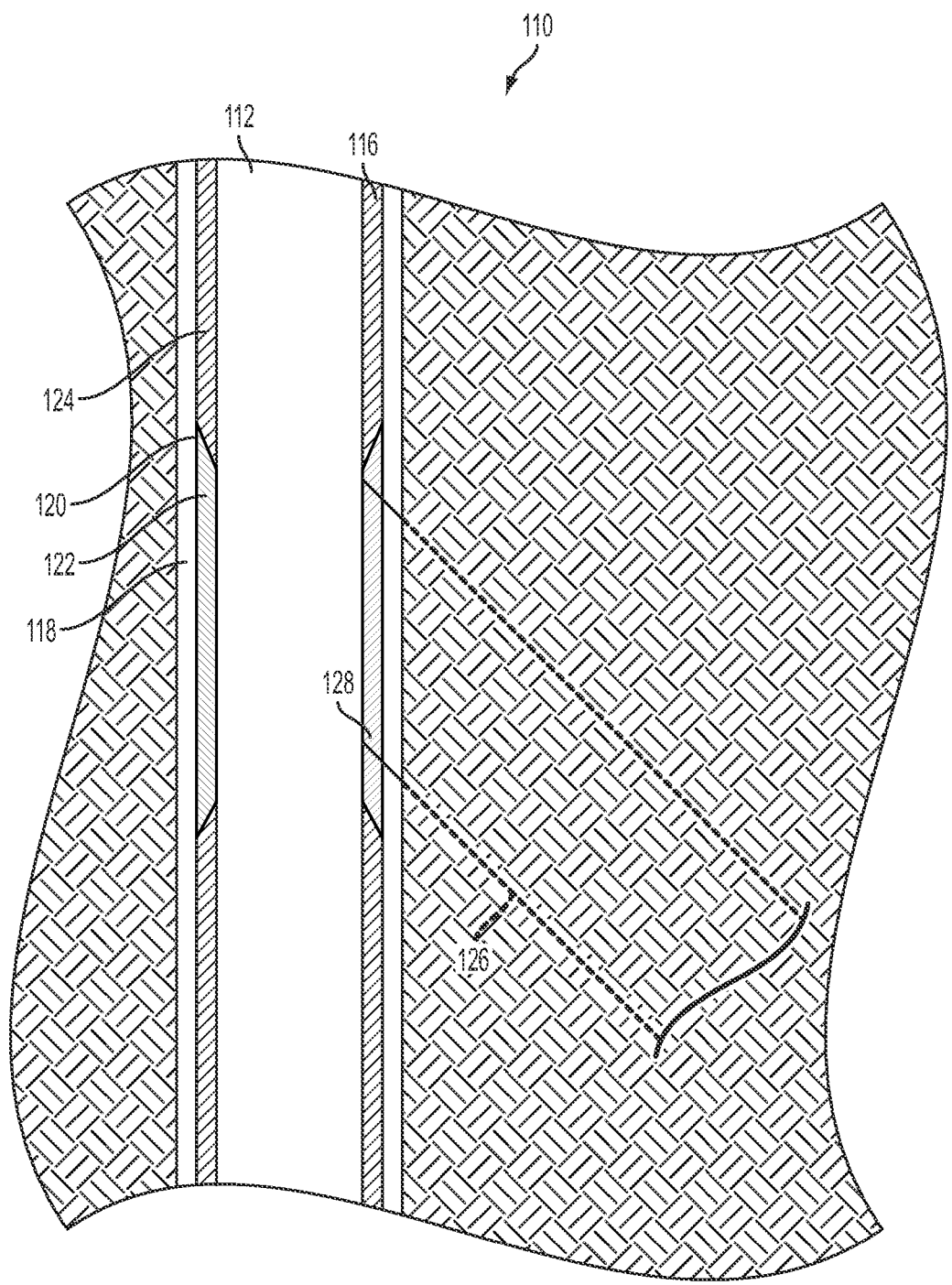
FIG. 1 is a schematic cross-sectional illustration of a well system having an assembly with material through which a window and then a branch wellbore can be created according to an embodiment of the present invention.

Certain aspects and embodiments of the present invention relate to assemblies capable of being disposed in a bore, such as a wellbore, of a subterranean formation and through which windows can be formed. An assembly according to certain embodiments of the present invention can include at least one casing joint that can provide support for a casing string in a high pressure and high temperature environment of a subterranean well. The assembly can avoid an increase in the outer diameter of the casing string and avoid introducing a large amount of debris after the window is formed through milling. An example of a high pressure and high temperature subterranean wellbore environment is one with a pressure greater than 2500 PSI and a temperature greater than 250° F.

An assembly according to some embodiments is part of a casing string that includes a steel joint coupled to an aluminum joint. The aluminum joint has an inner wall that is coated with a material to improve its wear resistance.

In some embodiments, the casing joint includes components that are coupled at a threaded portion of each component. For example, one component can include annular rings and grooves that form a threaded portion. The threaded portion can be tapered to a smaller cross-sectional thickness at an end of the threaded portion. The threaded portion can be on an inner wall or an outer wall of the component.

Similarly, a second component, which may be a casing string, can include annular rings and grooves to form a threaded second component portion. The threaded second component portion can also be tapered to a smaller cross-sectional thickness at an end of the threaded second component portion. The threaded second component portion can be located in an inner wall or an outer wall of the second component, depending on the location of the threaded first component portion. For example, if the threaded first component portion is located in an inner wall of the first component, the threaded second component portion is located in an outer wall of the second component. If the threaded first component portion is located in an outer wall, the threaded second component portion is located in an inner wall of the second component.

In some embodiments, the material from which the second component is made expands at a different rate or expands by a different amount than the material from which the first component is made. The grooves of the first component can be configured to allow for such differences in expansion rates/amounts, such as the second component expanding more than the first component, but maintain the coupling between the components.

The end of the second component having the smaller cross-sectional thickness can be located near or adjacent to part of the first component having a larger cross-sectional thickness. The end of the first component having the smaller cross-sectional thickness can be located near or adjacent to part of the second component having a larger cross-sectional thickness. The grooves of each can receive at least some of the annular rings. The second component can be coupled to the first component through the threaded portions by a compression joint, an interference fit, rotating one of the components with respect to the other, or other suitable coupling type.

The threadedly coupled components can provide a pressure seal between an inner region defined by the coupled components and an environment exterior to the coupled components. For example, the threaded coupling can allow the first component to withstand higher burst pressure than otherwise. As an assembly is run into a well, the hydrostatic pressure increases in the environment exterior to the coupled components. The coupled components can allow the pressure in the inner region to remain at a constant pressure, even when the pressure in the environment exterior to the assembly increases substantially. Assemblies according to some embodiments can withstand a high-pressure differential, such as a pressure differential of 22,000 PSI.

An assembly according to some embodiments can include one or more sealing members disposed between the components. Examples of a sealing member include a ring seal (such as an O-ring), a T-seal, a bonded seal, and an injectable sealing material. In some embodiments, the first component includes a groove in which an inner sealing member is disposed and the second component includes a groove in which an outer sealing member is disposed. The inner sealing member and the outer sealing member can cooperate with the components to provide the pressure seal between the inner region and the environment. For example, the outer sealing member can support the lower thickness parts of the second component, such as by allowing the second component to be forced against the outer sealing member when the second component experiences a collapse (i.e. external) pressure. The inner sealing member can support the lower thickness parts of the first component, such as by allowing the second component to be forced against the inner sealing member when the first component experiences a burst (i.e. internal) pressure.

The coupled components can define one or more chambers between the coupled components. A venting member can be included that is in fluid communication with a chamber and with an area outside of the components. The venting member may equalize pressure between the chamber and the area. The venting member can include any suitable component capable of regulating pressure. In some embodiments, the venting member is a pressure compensator capable of decreasing a differential pressure of a sealing member disposed between the first component and the second component and in proximity to the chamber. In some embodiments, the venting member is a channel through which an epoxy can be inserted and caused to be located in the chamber to seal the chamber from the area outside of the components.

In other embodiments, an inner sealing member is formed by part of the first component coupling to part of the second component by a metal-to-metal interference fit to form a seal against inside pressures (i.e. those pressures from an inner region defined by the first component coupled to the second component). The outer sealing member can be formed by a second part of the first component coupling to a second part of the second component by a metal-to-metal interference fit to form a seal against outside pressures (i.e. those pressures from an environment exterior to the first component coupled to the second component).

The components can be made from different materials. For example, the second component can be made from a high-strength material that can retain its original structure and integrity for a long time in a high pressure and high temperature subterranean environment. The first component can be made from a lower strength material that can retain its original structure and integrity for a shorter amount of time in the high pressure and high temperature subterranean environment and that can be milled easier than the high-strength material. For example, the material from which the second component is made can be sufficient to provide tensile strength for the assembly and the material from which the first component is made can withstand burst and collapse pressures.

The first component can retain its general shape and integrity during positioning of the assembly in a wellbore and for at least some amount of time in the wellbore after positioning. The first component can generate less debris after being milled as compared to the second component. Furthermore, the first component can provide less resistance to milling than the second component. Accordingly, a whipstock or deflector can be positioned relative to the first component to deflect a mill toward the first component to form a window in the first component to allow a branch wellbore to be created from a parent wellbore. In some embodiments, the first component includes a third type of material coupled to the material of the threaded portion. A window can be easily milled or drilled through the third type of material.

A "parent wellbore" is a wellbore from which another wellbore is drilled. It is also referred to as a "main wellbore." A parent or main wellbore does not necessarily extend directly from the earth's surface. For example, it could be a branch wellbore of another parent wellbore.

A "branch wellbore" is a wellbore drilled outwardly from its intersection with a parent wellbore. Examples of branch wellbores include a lateral wellbore and a sidetrack wellbore. A branch wellbore can have another branch wellbore drilled outwardly from it such that the first branch wellbore is a parent wellbore to the second branch wellbore.

Assemblies according to certain embodiments of the present invention can include additional components to provide pressure support. An example of such a component is a sleeve that can be located in the inner region defined by threadedly coupled components. Part of the inner sleeve can be adjacent to the threaded portions of the components. Part of the inner sleeve can also be adjacent to the non-threaded portions of the component that is lower in strength. The inner sleeve can be coupled to that component, such as via a shear screw locking system that provides room for thermal expansion or a snap ring, for example. The inner sleeve may provide support to that component prior to it being milled or drilled. The inner sleeve may also be coupled to the component of higher strength, such as by brazing, mechanical fastening or other suitable connection means.

In some embodiments, an inner sleeve that includes a castellation is disposed in the inner region. The castellation can carry torque from one end of the assembly to another end of the assembly.

These illustrative examples are given to introduce the reader to the general subject matter discussed here and are not intended to limit the scope of the disclosed concepts. The following sections describe various additional embodiments and examples with reference to the drawings, in which like numerals indicate like elements and directional descriptions are used to describe the illustrative embodiments but, like the illustrative embodiments, should not be used to limit the present invention.

FIG. 1 shows a well system 110 with an assembly 118 according to one embodiment of the present invention. The well system 110 includes a parent wellbore 112 that extends through various earth strata. The parent wellbore 112 includes a casing string 116 cemented at a portion of the parent wellbore 112.

The casing string 116 includes an assembly 118 interconnected with the casing string 116. The assembly 118 can include a joint 120 at which a first component 122 is coupled to a second component 124 of the assembly 118. The assembly 118 can be positioned at a desired location to form a branch wellbore 126 from the parent wellbore 112. The desired location can be an intersection 128 between the parent wellbore 112 and the branch wellbore 126. The assembly 118 can be positioned using various techniques. Examples of positioning techniques include using a gyroscope and/or an orienting profile.

Branch wellbore 126 is depicted with dotted lines to indicate it has not yet formed. To form the branch wellbore 126, a whipstock can be positioned in the inner diameter of the casing string 116 relative to the first component 122 of the assembly 118 and below the intersection 128. For example, keys or dogs associated with the whipstock can cooperatively engage an orienting profile to anchor the whipstock to the casing string 116 and to orient rotationally an inclined whipstock surface toward the first component 122.

Cutting tools, such as mills and drills, are lowered through the casing string 116 and deflected toward the first component 122. The cutting tools mill through the first component 122 and the subterranean formation adjacent to the window to form the branch wellbore 126. In some embodiments, the first component 122 is made from a material that is different from the material from which the second component 124 is made and that has a lower strength than the material from which the second component 124 is made. The first component 122 can be configured to support the assembly 118 when the assembly 118 is positioned and after positioning, without requiring an external sleeve or otherwise. Certain embodiments of the first component 122 can generate less debris during milling as compared to the second component 124.

Figure 2C:
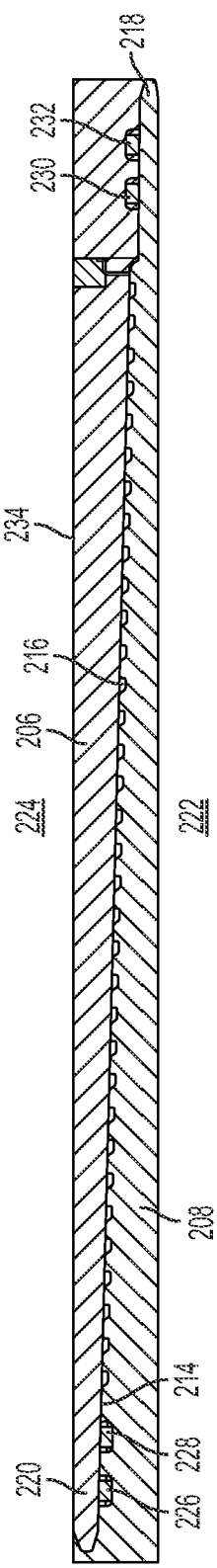
FIG. 2C is a cross-sectional view of the threaded coupling of FIG. 2A.

Assemblies according to various embodiments of the present invention can be in any desirable configuration to support branch wellbore formation and to interconnect with a casing string. FIGS. 2A, 2B, and 2C depict an assembly 202 according to one embodiment of the present invention. The assembly 202 includes a first component 206 coupled to a second component 208. The second component 208 includes two segments 210, 212 between which the first component 206 is positioned. The first component 206 can be made from a material through which a window can be milled or drilled to allow a branch wellbore to be formed. Examples of materials from which the first component 206 can be made include aluminum, aluminum alloys (such as 7075 aluminum or 6061 aluminum), copper-based alloys, magnesium alloys, free-cutting steels, cast irons, carbon fiber, reinforced carbon fiber, and low carbon steel alloys (such as 1026 steel alloy or 4140 steel alloy). The second component 208 can be made from a corrosive resistant material, such as 13-chromium, 28-chromium, or other stainless steel or nickel alloy.

The assembly 202 includes two coupling joints: (1) segment 210 coupled to the first component 206; and (2) segment 212 coupled to first component 206. Because the coupling mechanisms of these two coupling joints are the same or similar, the following describes only segment 210 coupled to first component 206. The same concepts are applicable to body segment 212 coupled to first component 206. Furthermore, assemblies according to some embodiments include only one coupling joint.

The segment 210 may be substantially tubular and can include a threaded portion 214 in an outer wall of the segment 210. The first component 206 can include a threaded first component portion 216 in an inner wall of the first component 206. The first component 206 may also be substantially tubular. The threaded portion 214 can be coupled to the threaded first component portion 216 to couple the first component 206 to the second component 208. For example, the threaded portion 214 can include annular grooves and rings capable of engaging annular rings and grooves, respectively, of the threaded first component portion 216. Although FIGS. 2A-C depict the threaded portion 214 in the outer wall of the segment 210 and the threaded first component portion 216 in the inner wall of the first component 206, certain assemblies can include a threaded portion in an inner wall of a segment and can include a threaded first component portion in an outer wall of a first component.

The threaded portion 214 can be tapered to a smaller cross-sectional thickness at an end 218 of the threaded portion 214. Similarly, the threaded first component portion 216 can be tapered to a smaller cross-sectional thickness at an end 220 of the threaded first component portion 216. The tapered portions can allow the second component 208 and the first component 206 to couple without increasing a diameter of the casing string. For example, the end 218 can be positioned adjacent to part of the threaded first component portion 216 with a cross-sectional thickness greater than the end 220. Likewise, the end 220 can be positioned adjacent to part of the threaded portion 214 with a cross-sectional thickness greater than the end 218.

The second component 208 coupled to the first component 206 can define an inner region 222 and can provide a pressure seal between the inner region 222 and an environment 224 exterior to the second component 208 coupled to the first component 206. In some embodiments, sealing members can be positioned between the threaded portion 214 and the threaded first component portion 216. FIG. 2C depicts outer sealing members 226, 228 disposed between the end 220 and part of the threaded portion 214 with a greater cross-sectional thickness than the end 218. The outer sealing members 226, 228 can be disposed in grooves in the second component 208. The outer sealing members 226, 228 can support the end 220, which has a relatively low thickness, such as by allowing the first component 206 to be forced against the outer sealing members 226, 228 when the first component 206 experiences a collapse (i.e. external) pressure from the environment 224 exterior to the second component 208 coupled to the first component 206. Inner sealing members 230, 232 are shown disposed in grooves of the first component 206 that are between the end 218 and the part of the threaded first component portion 216 with a greater cross-sectional thickness than the end 220. Inner sealing members 230, 232 can support the end 218 of the second component 208, which has a relatively low thickness, such as by allowing the second component 208 to be forced against the inner sealing members 230, 232 when the second component 208 experiences a burst (i.e. internal) pressure from the inner region 222.

In other embodiments, an inner sealing member is formed by part of the first component 206 coupling to part of the second component 208 by a metal-to-metal interference fit to form a seal against pressures from inner region 222. The outer sealing member can be formed by a second part of the first component 206 coupling to a second part of the second component 208 by a metal-to-metal interference fit to form a seal against pressures from environment 224.

A branch wellbore can be created by forming an opening in a wall of the first component 206. When the assembly 202 is disposed in a wellbore, a cutting tool can be deflected toward the first component 206. Because the first component 206 has a lower tensile strength than the second component 208, the cutting tool can be guided to the first component 206 because it presents to the cutting tool a lower resistance than does the second component 208. The cutting tool can mill or drill through the first component 206 and create an opening that is a window through which the branch wellbore can be formed.

In some embodiments, the segments 210, 212 are made from a different material than the material from which part (or all) of the first component 206 is made. These different materials may have different coefficients of thermal expansion. For example, the material from which the first component 206 is made may expand at a higher rate or expand more than the material from which the segments 210, 212 are made. The annular rings and grooves of each of the threaded portion 214 and the threaded first component portion 216 can be configured to account for such expansion. In some embodiments, the annular rings of the threaded first component portion 216 and the grooves of the threaded portion 214 are configured such that space of a certain amount is present between a side of an annular ring and a side of a groove before the assembly 202 is exposed to the environment of a wellbore. The space allows the threaded first component portion 216 to expand and allow the second component 208 and the first component 206 to remain coupled.

An inner surface of the first component 206 can be coated with a coating material that can increase wear resistance of the inner surface. The increased wear resistance can prevent wear by the first component 206 when it contacts downhole tools. Examples of downhole tools include drill pipe, drill collars, drill bits, reamers, stabilizers, tubing, packers, screens, and stimulation tools. The coating material can resist wear of tools rotating (and being tripped) through an inner region defined by the first component. The coating material, however, can be milled and/or drilled such that a window can be created in the first component 206. Any type of coating material can be used. The coating material may also increase the corrosion resistant properties of the inner wall. In some embodiments, the coating material is a material that is non-conductive when in service conditions. Examples of suitable coating material include an epoxy-phenolic material such as Tube-Kote® Aluminum Pipe Coating, TK-34AL available from National Oilwell Varco of Houston, Tex.; an epoxy and polyphenylene sulfide composite material such as External Tubular Coating available from National Oilwell Varco; and a synergistic coating material such as Magnaplate HCR® available from General Magnaplate Corp. of Linden, N.J.

In some embodiments, the threaded first component portion 216 and/or an outer surface 234 of first component 206 is coated with one or more corrosion resistant materials, such as the coating material described above or a different material. For example, the first component 206 can be made from aluminum, which may be more susceptible to some types of corrosion from the subterranean wellbore environment, such as from fresh water, chemicals, brine fluids (e.g. calcium chloride, sodium chloride, potassium chloride, calcium bromide, potassium bromide, and combinations of these), or otherwise. In some embodiments, an inner surface of the first component 206 is coated with the more corrosion resistant material. Furthermore, the threaded first component portion 216 may be more susceptible to galvanic corrosion due to contact with the threaded portion 214, which may be steel. All or part of the first component 206 can be coated by a coating material that is more corrosion resistant than aluminum. In some embodiments, an inner wall of the first component 206 is coated with a coating material to improve its wear resistance. Examples of suitable coating material include the materials identified as suitable coating materials for the inner surface and also include polytetrafluoroethylene, which is known by the brand name, Teflon® available from E. I. du Pont de Nemours and Company, Wilmington, Del., and Safe-Gard Organic Anodize Seal from SanChem, Inc. of Chicago, Ill.

In some embodiments, the threaded first component portion 216 is coated with a coating material that is different than a coating material by which the outer surface 234 is coated. In other embodiments, the coating materials are the same type of coating material. Certain coating materials may reduce wear, reduce affects from abrasion, increase hardness, and improves frictional properties of the first component 206.

The first component 206 can be coated using any suitable process. Examples of suitable coating processes include soft anodize coating, anodized coating, electroless nickel plating, hard anodized coating, ceramic coatings, carbide beads coating, plastic coating, thermal spray coating, a nano high velocity oxygen fuel (HVOF) coating, and metallic coating. Sacrificial anodes can also be used. In some embodiments, the threaded portion 214 is also is treated or coated to reduce galvanic corrosion and galling of surfaces. For example, cooper plating can be used on the threaded portion 214 to reduce galling when contacting aluminum. Examples of other coatings include molydeum sulfide and suitable polymers.

Figure 3:
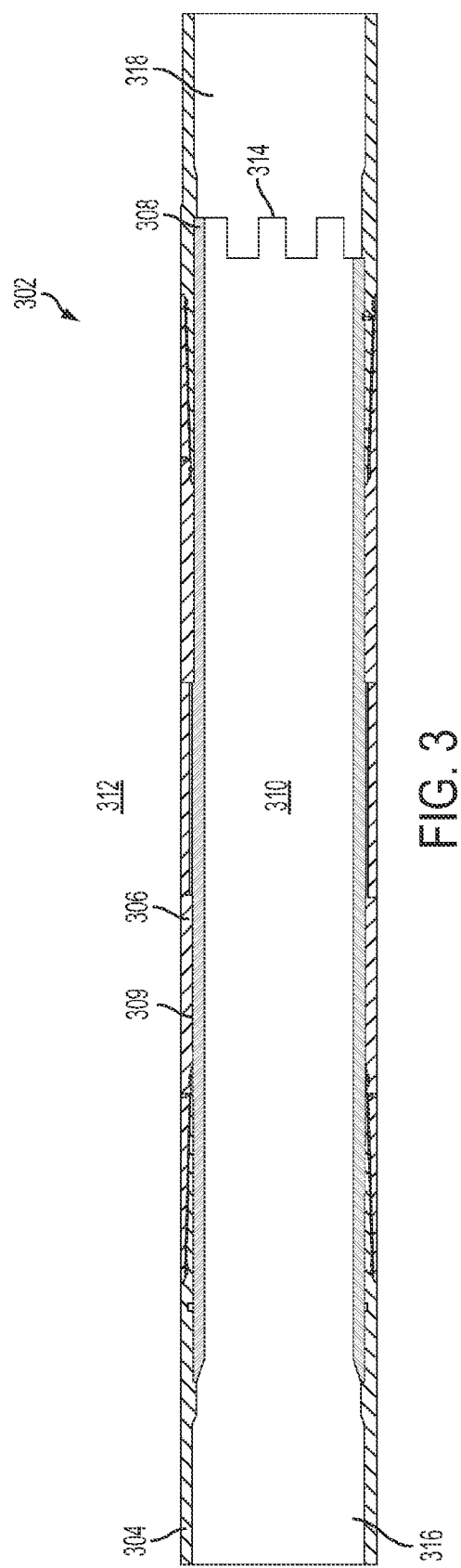
FIG. 3 is a cross-sectional view of an assembly according to a second embodiment of the present invention.

FIG. 3 depicts an assembly 302 according to a second embodiment of the present invention. The assembly 302 includes a second component 304 coupled to a first component 306 in a similar manner as the coupling depicted and described with reference to the embodiment in FIGS. 2A-C. The assembly 302 includes a sleeve 308 disposed in an inner region 310 defined by the second component 304 coupled to the first component 306. Sleeve 308 is depicted as being in an inner circumferential portion of the assembly 302. Sleeves according to various embodiments can have any suitable configurations, including configurations that surround an entire inner circumferential portion of an assembly and configurations that do not surround an entire inner circumferential portion of an assembly. In some embodiments, the sleeve 308 is made from easily millable material that can assist in protecting an outer sleeve, for example an outer sleeve made from aluminum, from corrosion and wear, and can also support the outer sleeve during axial loading.

The sleeve 308 can also provide support to the second component 304 coupled to the first component 306 to prevent detrimental effects experienced from burst and/or collapse pressures, for example. In some embodiments, the second component 304, first component 306, and sleeve 308 provide a pressure seal between the inner region 310 and an environment 312 exterior to the second component 304 and the first component 306. The sleeve 308 may be made from any type of suitable material. Examples of suitable materials include fiberglass, carbon fiber, fabric reinforced polymer, and low carbon steel.

The sleeve 308 can be coupled to the first component 306 by any suitable means 309. Examples of suitable means 309 include an adhesive, a weld, a snap ring, a mechanical fastener, and a castellation. The sleeve 308 can also be coupled to the second component 304 by any suitable means. Examples of suitable means for coupling the sleeve 308 to the second component include a snap ring or a shear screw and pin. The sleeve 308 may be easily milled and/or drilled to create a window in a wall of the sleeve 308 through which an opening in the first component 306 and through which a branch wellbore can be created. In other embodiments, the sleeve 308 includes a pre-milled opening through which a mill or a drill can pass. For example, the opening can be located adjacent part of the first component 306 that can be milled.

The sleeve 308 can provide wear resistance during rotation of drilling equipment in the assembly 302 or otherwise. In some embodiments, the sleeve includes one or more wear pads positioned on an inner surface and/or an outer surface of the sleeve 308. The wear pads can provide additional wear resistance and the wear pads may be made from materials such as composites or carbides.

The sleeve 308 can include a castellation 314 configured to carry torque from a first end 316 of the assembly 302 to a second end 318 of the assembly 302. In other embodiments, the sleeve 308 does not include the castellation 314, or includes the castellation 314 but does not carry torque.

Figure 4:
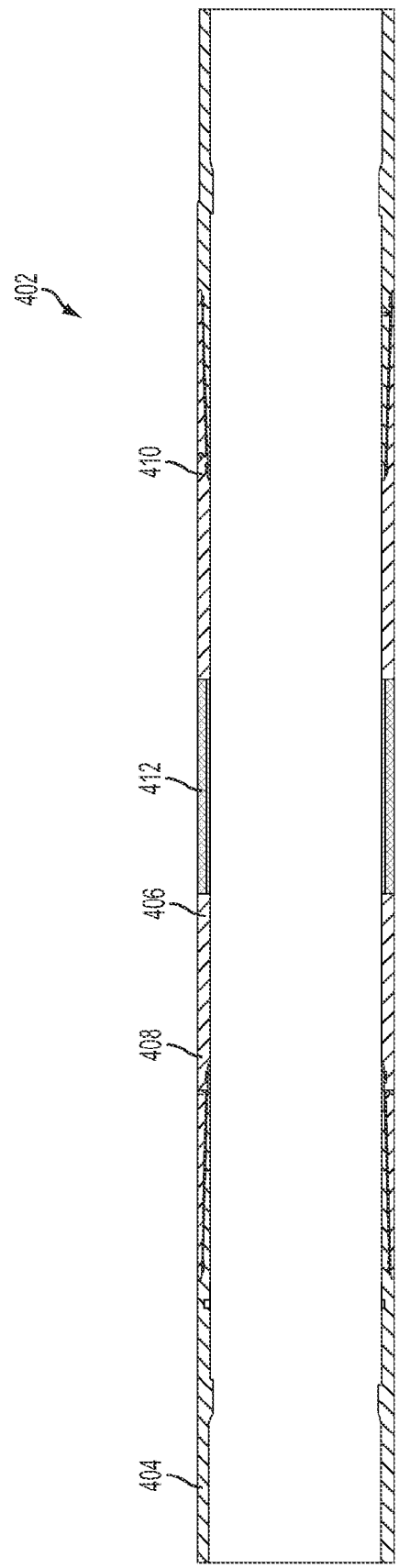
FIG. 4 is a cross-sectional view of an assembly according to a third embodiment of the present invention.

FIG. 4 depicts an assembly 402 according to a third embodiment of the present invention. The assembly 402 includes a second component 404 coupled to a first component 406 in a similar manner as the coupling depicted and described with reference to the embodiment in FIGS. 2A-C. The first component 406 includes three elements: a first coupling element 408, a second coupling element 410, and a window element 412. The first coupling element 408 and the second coupling element 410 are configured to couple to portions of the second component 404 in a manner similar to the coupling in FIGS. 2A-C. The first coupling element 408 can be made from the same or different material than the second coupling element 410. In some embodiments, the first coupling element 408 and the second coupling element 410 are made from the same material as the material from which the second component 404 is made.

The window element 412 may be made from a material that is easier to mill and drill than the materials from which the first coupling element 408 and the second coupling element 410 are made. For example, the material from which window element 412 is made may have a lower tensile strength than the material from which the first coupling element 408 and the second coupling element 410 are made. Examples of materials from which the window element 412 can be made include fabric reinforced polymer, carbon fiber, fiberglass, para-aramid synthetic fiber, silicon carbide, aluminum, and carbon nanotubes. The window element 412 can be coupled to the first coupling element 408 and the second coupling element 410 using any suitable coupling mechanisms. Examples of suitable coupling mechanisms include a weld, a rivet, a flange, brazing, and via a bonding agent.

An opening that is a window can be made in the window element 412. A branch wellbore can be created through the window. Milling or drilling through the lower tensile strength material can be easier, and may result in less debris, than drilling or milling through a higher tensile strength material, such as the material(s) from which the first coupling element 408, second coupling element 410, and second component 404 are made.

In some embodiments, the assembly 402 includes a sleeve, such as the sleeve 308 from FIG. 3, disposed in an inner region defined by the second component 404 and the first component 406. The sleeve can support the first component 406, including the window element 412 before the window element 412 is milled or drilled.

Assemblies according to some embodiments of the present invention include one or more chambers between threadedly coupled components. The chambers may be sealed and exhibit pressure on the components. The assemblies can include venting members that can equalize pressure of the chambers and an area outside of the components to reduce the pressure. The area outside of the components can include an inner region defined by the coupled components and an environment exterior to the coupled components.

Figure 5:
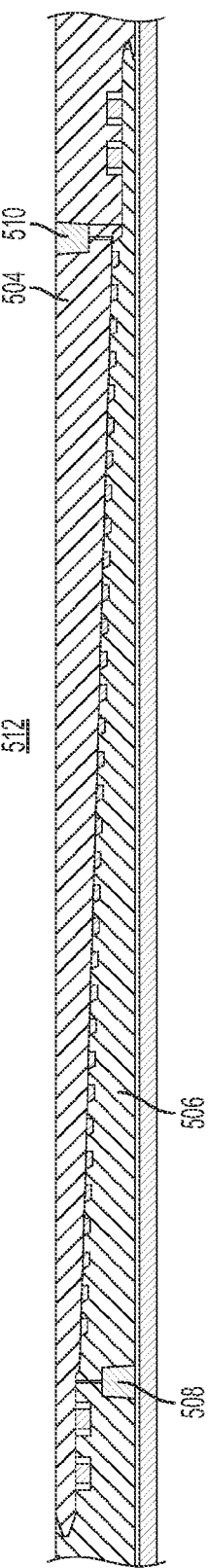
FIG. 5 is a cross-sectional view of a threaded coupling with venting members according to one embodiment of the present invention.

FIG. 5 depicts a cross-sectional view of a threaded coupling 502 that includes a first component 504 threadedly coupled to a second component 506 and venting members 508, 510. The first component 504 may be made from a material having a lower strength than the material from which the second component 506 is made. The first component 504 coupled to the second component 506 can define one or more chambers (not shown) between the components. The venting members 508, 510 can each allow pressure to equalize between the chambers and an area 512 outside of the first component 504 and the second component 506. In some embodiments, the venting members 508, 510 are ports through which pressure in the chamber can equalize with the pressure outside of the components.

Venting chambers in an assembly can enhance the sealing capability of the threaded coupling. Venting the chambers may also increase the burst resistance and the collapse resistance of the threaded coupling and preventing corrosive fluid from contacting threads to increase corrosion resistance of the threaded coupling.

Figure 6:
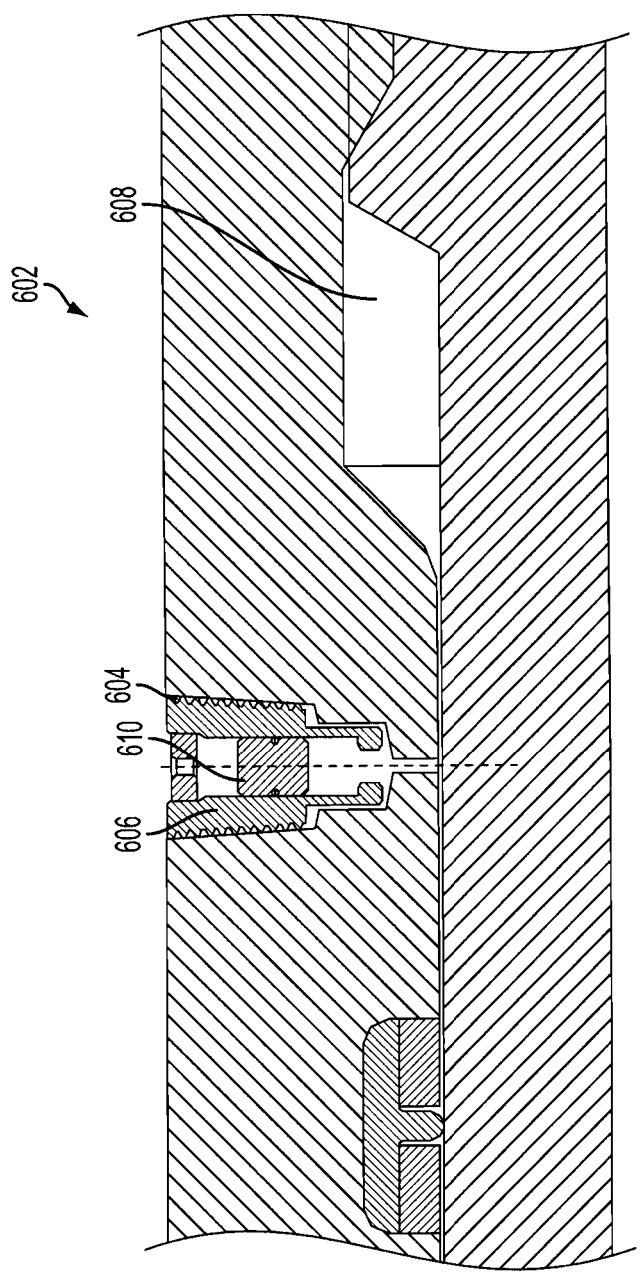
FIG. 6 is a cross-sectional view of a venting member with a pressure compensator according to one embodiment of the present invention.

FIG. 6 depicts part of an assembly 602 with a venting member 604 that includes a pressure compensator 606 disposed in the venting member 604. The pressure compensator 606 can decrease differential pressure between a chamber 608 and an area outside of the assembly 602. The pressure compensator 606 can include a piston 610 that is configured to change position in the pressure compensator to equalize the pressure. In some embodiments, a spring (not shown) can be positioned under the piston 610. The spring can hold the piston 610 in an "out" position until exterior pressure increases to level that causes the spring to be compressed, resulting in a lower pressure differential.

In other embodiments, a venting member for an assembly can provide a channel through which an epoxy or other substance can traverse to one or more chambers. The epoxy or other substance can harden in the chamber to seal the chamber from the area outside of the threaded coupling.

Figure 7A:
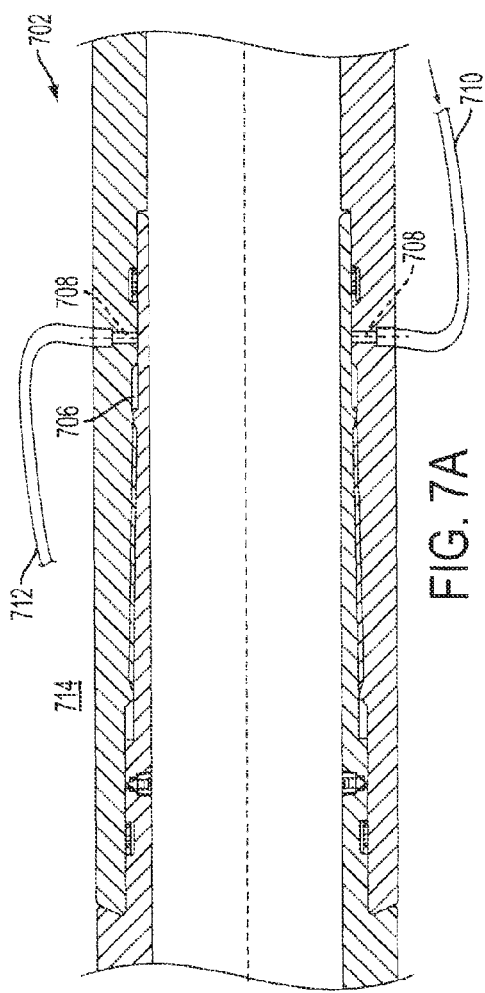
FIG. 7A is a cross-sectional view of a coupling with a chamber and a venting member according to one embodiment of the present invention.
Figure 7B:
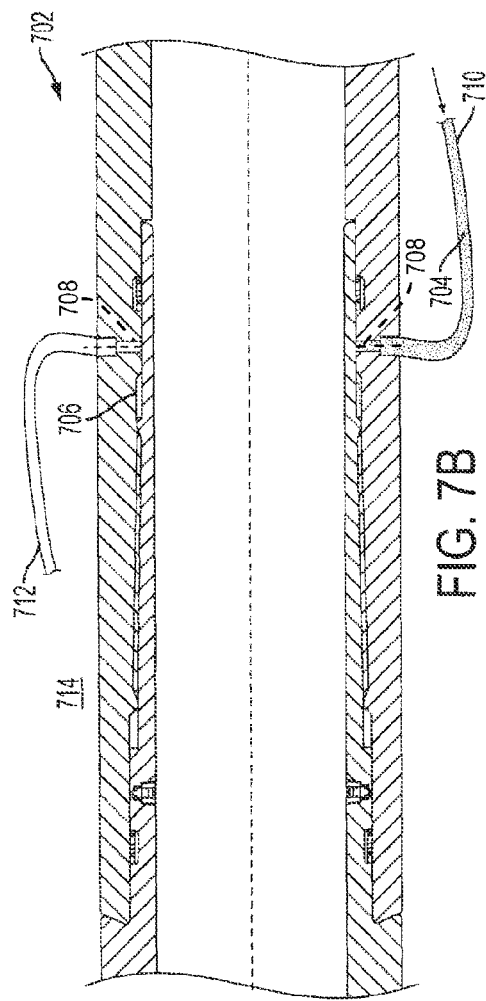
FIG. 7B is a cross-sectional view of the coupling of FIG. 7A with epoxy traversing to the chamber according to one embodiment of the present invention.

FIGS. 7A-7D depict an assembly 702 in which epoxy 704 is introduced to seal a chamber 706. FIG. 7A shows a venting member 708 coupled to a tube 710 for introducing epoxy 704 and a venting tube 712 for facilitating epoxy introduction. FIG. 7B depicts epoxy 704 being introduced through the tube 710 to the venting member 708. The venting member 708 can provide a channel through which the epoxy 704 traverses to the chamber 706. The epoxy can fill the chamber 706, as shown in FIG. 7C. The epoxy 704 can be configured to harden after a certain amount of time and seal the chamber 706 from the area 714 outside of the assembly 702, as shown in FIG. 7D. The chamber 706 can be plugged after filling with epoxy 704 that then hardens, such that a pressure seal is maintained. The epoxy 704 may be any suitable material capable of bonding to the surfaces and include sufficient elasticity after hardening to maintain a seal when the components experience thermal expansion.

Figure 8:
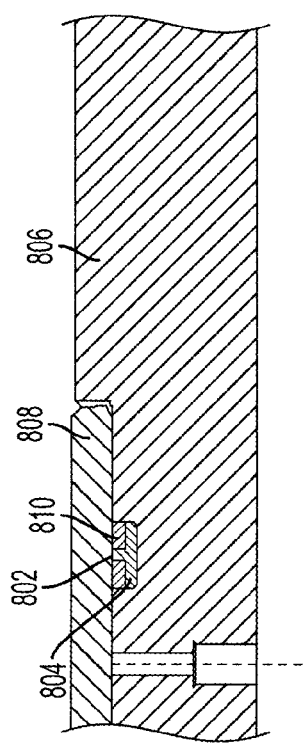
FIG. 8 is a cross-sectional view of a sealing member that is a T-seal according to one embodiment of the present invention.
Figure 9:
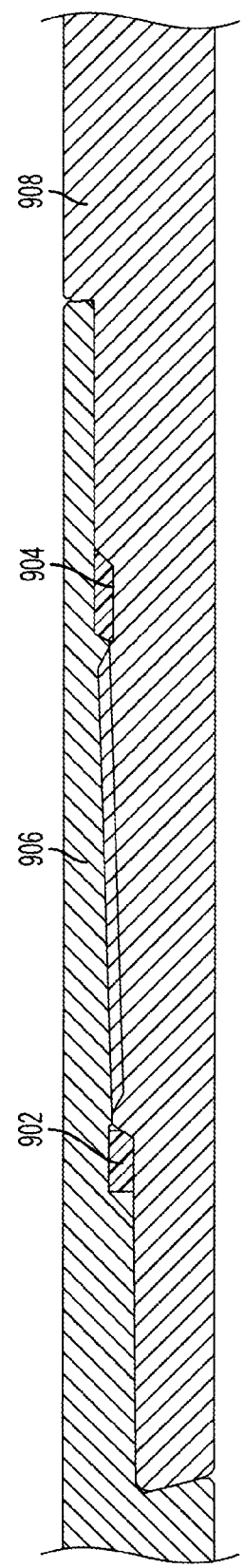
FIG. 9 is a cross-sectional view of a sealing member that is a bonded seal according to one embodiment of the present invention.

As stated above, sealing members according to various embodiments of the present invention can be any suitable structure that can cooperate with the components to provide a seal between an inner region and an environment exterior to the components. FIG. 2C, for example, depicts rings, such as O-rings, as sealing members. FIGS. 8 and 9 depict other types of sealing members. FIG. 8, for example, depicts a T-seal 804 in a groove 802 between threadedly coupled components 806, 808. Embodiments of the T-seal 804 can prevent or eliminate the spiral or twisting failure that can occur with other sealing mechanisms. A back-up ring 810 can be included with the T-seal 804. An example of T-seal 804 is Parker's T-Seal available from Parker Hannifin Corp. of Cleveland, Ohio.

FIG. 9 depicts sealing members that are bonded seals 902, 904. Each of the bonded seals 902, 904 is physically bonded to either component 906 or component 908. The bonded seals 902, 904 can each be bonded to one of the components 906, 908 on one to three sides.

Other types of sealing members include ring seals that can be molded to a suitable shape, but installed prior to creating threads on a component. In other embodiments, the ring seals are stretched such that the ring seals can be slid into a desired position.

The foregoing description of the embodiments, including illustrated embodiments, of the invention has been presented only for the purpose of illustration and description and is not intended to be exhaustive or to limit the invention to the precise forms disclosed. Numerous modifications, adaptations, and uses thereof will be apparent to those skilled in the art without departing from the scope of this invention.

What is claimed is:

1. An assembly for a casing string capable of being disposed in a bore of a subterranean formation, the assembly comprising:
a first component;
a second component coupled to the first component to define an inner region, the first component configured for being easier to mill than the second component, wherein the second component coupled to the first component comprises an outer diameter that is equal to or less than an outer diameter of a portion of the casing string to which at least one of the first component or second component is coupled;
an inner sealing member;
an outer sealing member, wherein the inner sealing member and the outer sealing member are capable of cooperating with the first component and the second component to provide a pressure seal between the inner region and an environment exterior to the first component and the second component;
wherein the first component is made from aluminum and comprises an inner wall having threads for coupling to the second component;
wherein the threads are coated by a coating material capable of being between the threads and the second component when the threads are coupled to the second component, the coating material being nonconductive.

2. A casing joint of a casing string capable of being disposed in a bore of a subterranean formation, the casing joint comprising:
a first component;
a second component coupled to the first component to define at least one chamber between the first component and the second component, the first component configured for being easier to mill than the second component, wherein the second component coupled to the first component comprises an outer diameter that is equal to or less than an outer diameter of portion of the casing string to which at least one of the first component or second component is coupled;
a venting member in fluid communication with the at least one chamber and in fluid communication with an area outside of the second component coupled to the first component;
wherein the first component is made from aluminum and comprises an inner wall having threads for coupling to the second component;
wherein the threads are coated by a coating material capable of being between the threads and the second component when the threads are coupled to the second component, the coating material being nonconductive.

3. An assembly for a casing string capable of being disposed in a bore of a subterranean formation, the assembly comprising:
a first component made from aluminum and comprising an inner wall having threads for coupling to a second component to (i) define an inner region, (ii) define an outer diameter, and (iii) provide a pressure seal between the inner region and an environment exterior to the first component and the second component,
wherein the outer diameter is equal to or less than an outer diameter of portion of the casing string to which at least one of the first component or second component is configured to couple,
wherein the threads are coated by a coating material capable of being between the threads and the second component when the threads are coupled to the second component, the coating material configured for being nonconductive.

4. The assembly of claim 3, wherein the first component comprises an outer wall having a second coating material disposed on at least part of the outer wall, the second coating material being at least one of more corrosion resistant than aluminum or nonconductive.

5. The assembly of claim 4, wherein the coating material and the second coating material are the same type of material.

6. The assembly of claim 3, wherein the threads are capable of being coated by the coating material by at least one of:
   soft anodize coating;
   electroless nickel plating;
   anodized coating; or
   thermal spray coating.

7. The assembly of claim 3, wherein the coating material comprises at least one of:
   polytetrafluoroethylene;
   a plastic;
   a ceramic;
   a non-conducting material; or
   a metal.

8. The assembly of claim 3, further comprising:
   the second component coupled to the first component, the first component configured for being easier to mill than the second component;
   an inner sealing member disposed in a first component groove; and
   an outer sealing member disposed in a second component groove,
   wherein the inner sealing member and the outer sealing member are capable of cooperating with the first component and the second component to provide a seal between the inner region and the environment exterior to the first component and the second component.

9. The assembly of claim 3, wherein the second component coupled to the first component defines at least one chamber between the first component and the second component,
   wherein the assembly further comprises a venting member capable of being in fluid communication with the at least one chamber and in fluid communication with an area outside of the first component and the second component.

* * * * *

UNITED STATES PATENT AND TRADEMARK OFFICE
CERTIFICATE OF CORRECTION

| | |
|---|---|
| PATENT NO. | : 9,234,613 B2 |
| APPLICATION NO. | : 12/789822 |
| DATED | : January 12, 2016 |
| INVENTOR(S) | : David Joe Steele et al. |

It is certified that error appears in the above-identified patent and that said Letters Patent is hereby corrected as shown below:

Specification

In column 11, line 3, delete "molydeum" and insert -- molybdenum --, therefor.

Signed and Sealed this
Tenth Day of May, 2016

Michelle K. Lee
*Director of the United States Patent and Trademark Office*